Patented Nov. 6, 1923.

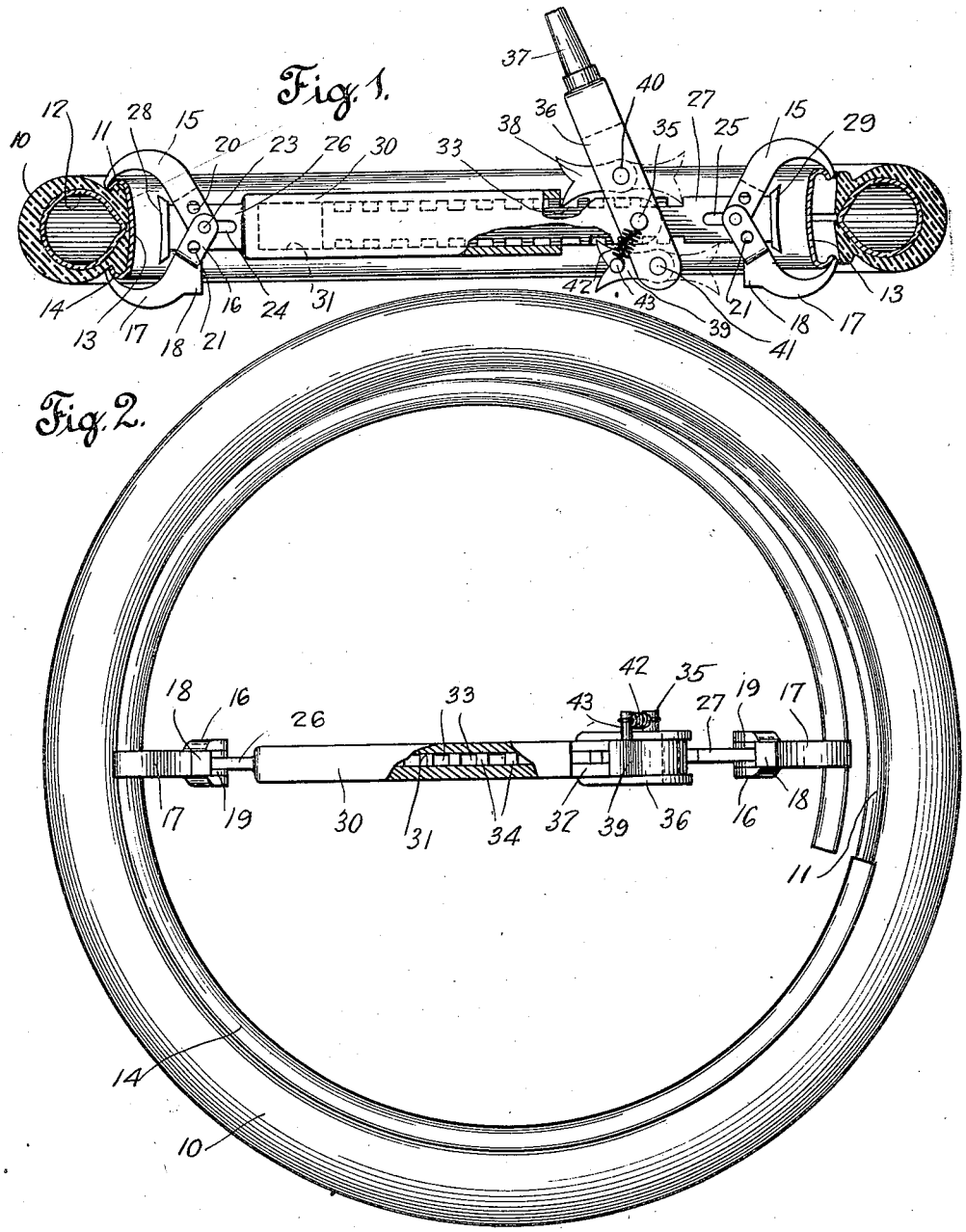

1,473,397

UNITED STATES PATENT OFFICE.

ARTHUR BOOCK, OF TRIPP, SOUTH DAKOTA.

TIRE REMOVER.

Application filed December 5, 1921. Serial No. 520,063.

*To all whom it may concern:*

Be it known that I, ARTHUR BOOCK, a citizen of the United States, and a resident of the town of Tripp, county of Hutchinson, and State of South Dakota, have invented certain new and useful Improvements in Tire Removers, of which the following is a specification.

This invention relates to tire removers.

One of the purposes of the present invention is to produce a device for mounting or dismounting inflated tires with respect to the channelled wheel rim used in connection therewith, the device being easily and quickly applied and operated.

Another object is in the provision of means whereby the apparatus may be adjusted to suit various sizes of tires and also those of different diameter.

A further object is to provide means adapted not only to retracting the channel from the tire, but also to press it firmly outward into contact and proper engagement therewith, as may be desirable.

These and other analogous objects are secured by the novel construction, combination and arrangement of parts hereinafter described in detail and shown in the drawing accompanying, in which:—

Figure 1 is a sectional view of a conventional type of tire and rim, together with a side view of the device in operative position, parts being broken away to show the construction.

Figure 2 is a side view of the tire and bottom plan view of the device as in operation.

In the drawing, the numeral 10 designates the tread or shoe of a common pneumatic tire, the same being formed with beads 11 at their inner circumference, and contains an inner inflatable tube 12.

The split, demountable rim 13 is formed in the shape of a channel, its outwardly turned flanged edges 14 engaging the beads of the tire, holding its adjacent edge firmly in its grasp when the inner tube 12 is inflated.

In assembling the shoe upon the rim it is necessary to spring the rim inwardly, at one end, to permit passing the shoe over the flange and the rim must also be sprung in order to remove or demount the tire.

The device for accomplishing this purpose consists of two pairs of hooked elements shaped to engage the rim flanges, the upper hooks 15 in each pair being flat and adapted to operate freely within the forked shank elements 16 of the mating hooks 17, disposed at the lower side of the apparatus and provided with lugs 18 which may be used as feet in operating the device.

The shanks of the hooks 15 are bifurcated, as at 19, and contain two drilled holes 20, which may be brought into registration with similar holes 21, through which are passed pins 23 upon which both upper and lower hooks freely pivot, the arrangement being such that the pin may be passed through either the end or adjacent holes, thus allowing for adjustment between the hooks to suit different sizes of tires.

The pins 23 pass through elongated slots 24 and 25 formed respectively in bars 26 and 27, these bars having enlarged concavely faced heads 28 and 29 adapted to engage the inner surface of the rim 14 as later described.

The bar 26 extends integrally from the end of a casing or hollow body 30, which may be made cylindrical or rectangular as shown, the same containing a recess 31 beyond which the sides 32 extend oppositely to the bar 26.

Fitted between the sides 32 in the recess 31 is a slide 33 having teeth 34 upon its opposite edges, the ends of the teeth, which are preferably square, being guided in the casing, the slide being integral with the bar 27.

Pivoted on pins 35 set in the sides 32, is a fork 36 secured to the end of a handle 37 extending to a convenient length for manual operation, at the upper side of the apparatus.

A pair of dogs 38 and 39 are pivoted between the elements of the fork 36 on pins 40 and 41, respectively above and below the pivot pin 35, these dogs being reversible and capable of engaging the teeth 34 of the slide to convey motion to it in either direction, in accordance with their position when the lever handle 37 is rocked.

A tension spring 42 is attached at its ends respectively to the extending pin 35 and a pin 43 fixed in the lower dog 39 so as to hold it in operative position when extended in either direction, the other upper dog engaging the teeth by gravity.

In operation, the distance between the hooks 15 and 17 having been adjusted to the width of the rim, the implement is engaged so that one pair of the hooks is close to one of the ends of the rim, the dogs positioned as shown in full lines in Figure 1 and the handle 37 oscillated.

This causes the dogs to successively engage the teeth, imparting longitudinal movement of the slide 33 within the casing, drawing the pairs of hooks forcibly towards each other, which action obviously pulls the loose end of the rim inwardly, freeing the shoe.

If it be desired to press the rim outwardly, the position of the dogs is reversed, as shown in the broken lines in Figure 1, and upon operation of the handle, the heads 28 and 29 are pushed oppositely outward, forcing the rim to engage the beads in a manner that will be clearly understood.

From the foregoing it will be seen that a simple device for the purposes set forth has been disclosed in the preferred form of its embodiment, but it is not desired to restrict the details to the exact construction shown, as obviously any changes may be made, not involving the exercise of invention and without conflicting with the scope and spirit of the appended claims.

Having thus described my invention what I claim as new and desire to secure by Letters Patent, is:—

1. A tire tool comprising a casing having one end thereof closed and terminating in a rim engaging head, a slidable bar adjustably supported in the open end of said casing and having a rim engaging head at its outer end, clamping hooks having their inner ends bifurcated and interfitting, fastening means extending through said interfitting bifurcated portions for adjustably supporting the same on said casing and said bar adjacent the rim engaging heads thereof, the free ends of said hooks being curved inwardly and adapted to engage diametrically opposed sides of a rim.

2. A tire tool comprising a casing having an extension at one end thereof, a slidable bar adjustably supported in the other end of said casing, said extension and bar having slots formed therein adjacent the outer ends thereof, rim engaging heads provided at the outer ends of said extension and said bar, clamping hooks having their inner ends bifurcated and interfitting one another, said bifurcated ends being provided with spaced apertures therein, fastening means extending through one pair of registering apertures, and through each of said slots for adjustably supporting said hooks on said extension and said bar, the free ends of said clamping hooks being adapted to engage diametrically opposite sides of the rim.

Signed at Tripp in the county of Hutchinson and State of South Dakota this 13th day of September, A. D. 1921.

ARTHUR BOOCK.